(12) United States Patent
Schwab

(10) Patent No.: US 7,888,441 B2
(45) Date of Patent: Feb. 15, 2011

(54) METAL-CONTAINING COMPOSITIONS

(75) Inventor: Joseph J. Schwab, Huntington Beach, CA (US)

(73) Assignee: Pryog, LLC, Attleboro, MA (US)

( * ) Notice: Subject to any disclaimer, the term of this patent is extended or adjusted under 35 U.S.C. 154(b) by 750 days.

(21) Appl. No.: 11/792,738

(22) PCT Filed: Dec. 9, 2005

(86) PCT No.: PCT/US2005/044670

§ 371 (c)(1),
(2), (4) Date: Jun. 12, 2007

(87) PCT Pub. No.: WO2006/065660

PCT Pub. Date: Jun. 22, 2006

(65) Prior Publication Data

US 2008/0045682 A1  Feb. 21, 2008

Related U.S. Application Data

(60) Provisional application No. 60/634,890, filed on Dec. 13, 2004.

(51) Int. Cl.
*C08F 30/04* (2006.01)
(52) U.S. Cl. .................. 526/240; 526/241; 526/319; 526/321; 526/323.1; 526/323.2; 526/325; 524/356; 524/366; 524/379
(58) Field of Classification Search .................. None
See application file for complete search history.

(56) References Cited

U.S. PATENT DOCUMENTS

| | | | |
|---|---|---|---|
| 3,264,272 A | 8/1966 | Rees | 260/78.5 |
| 3,379,702 A * | 4/1968 | Edward | 526/240 |
| 3,672,942 A | 6/1972 | Neumann et al. | 117/62.2 |
| 3,705,137 A * | 12/1972 | Kuwahara et al. | 526/62 |
| 4,022,960 A * | 5/1977 | Mima et al. | 522/181 |
| 4,129,524 A * | 12/1978 | Nagai et al. | 252/478 |
| 4,429,094 A | 1/1984 | Massucco | 526/240 |
| 4,585,841 A | 4/1986 | Eguchi et al. | 526/240 |
| 4,608,409 A | 8/1986 | Coady et al. | 524/399 |
| 5,064,877 A | 11/1991 | Nass et al. | 522/172 |
| 5,159,035 A * | 10/1992 | Evani | 526/240 |
| 5,484,867 A | 1/1996 | Lichtenhan et al. | 528/9 |
| 5,559,200 A * | 9/1996 | Suzuki et al. | 526/224 |
| 5,664,041 A | 9/1997 | Szum | 385/128 |
| 5,856,415 A | 1/1999 | Lagace et al. | 526/192 |
| 6,194,504 B1 | 2/2001 | Nagel et al. | 524/394 |
| 6,291,070 B1 | 9/2001 | Arpac et al. | 428/412 |
| 6,432,526 B1 | 8/2002 | Arney et al. | 428/328 |
| 6,553,169 B2 | 4/2003 | Fabian | 385/128 |
| 6,656,990 B2 | 12/2003 | Shustack et al. | 524/430 |
| 6,844,950 B2 | 1/2005 | Ja Chisholm et al. | 359/49 |
| 6,846,572 B2 | 1/2005 | Yamaguchi et al. | 428/524 |
| 7,083,831 B1 * | 8/2006 | Koch et al. | 427/515 |
| 2002/0082323 A1 | 6/2002 | Chawla et al. | 524/203 |
| 2004/0171743 A1 | 9/2004 | Flaim et al. | 524/577 |
| 2007/0287747 A1 * | 12/2007 | Finmans et al. | 514/492 |

FOREIGN PATENT DOCUMENTS

JP          56-147101 A      * 11/1981

OTHER PUBLICATIONS

"Inorganic-Organic Hybrid Polymers from Surface-Modified Oxometallate Clusters" authored by Schubert et al. and published in Mat. Res .Symp. Proc., (2000) vol. 628, CC2.3.1-CC2.3.11.*
Abstract for JP 57-28116 (Feb. 1982).*
E. Bryan Coughlin, "Silsesquioxane based Inorganic Organic Hybrid Copolymers".
"Brewer Science Offers Novel High Refractive Index Polymers"—www.brewerscience.com.
Yubao Wang et al, "Hybrid high refractive index polymer coatings".
Henry W. Oviatt, "Polyhedral Oligomeric SilSesquioxane (POSS) Fillers as Refractive Index Enhancers for Silicone Intraocular Lenses", 18-9333.
D. Skrtic et al, "Dental composites based on hybrid and surface-modified amorphous calcium phosphates", Biomaterials 25 (2004), pp. 1141-1150.
D. Skrtic et al, "Volumetric contraction and methacrylate conversion in photo-polymerized amorphous calcium phosphate/methacrylate composites", Biomaterials 24 (2003), pp. 2443-2449.
International Search Report for International Application No. PCT/US05/44670 dated Jun. 26, 2006.
International Search Report for International Application No. PCT/US06/22885 dated Feb. 12, 2008.

* cited by examiner

*Primary Examiner*—Marc S Zimmer
(74) *Attorney, Agent, or Firm*—Alix, Yale & Ristas; LLP

(57) ABSTRACT

The present invention relates to metal-containing compositions comprising a metal-containing precursor unit (MU), a prepolymer unit (PU), and a catalyst or an initiator capable of inducing a combining reaction of ethylenically unsaturated groups of the metal-containing precursor unit and the prepolymer unit. In another embodiment, the composition comprises MU and a catalyst or initiator capable of inducing a combining reaction of the metal-containing precursor units. Both MU and PU contain additional functional groups, which may be selected to impart compatibility with each other and to produce optically clear films. The metal-containing compositions can be used to produce films or articles having a transmittance of at least 90% and index of refraction in the range of 1.4 to 1.8 in the 400-700 nm range of light and 1.4 to 2.4 in the 150-400 nm range of light.

44 Claims, No Drawings

METAL-CONTAINING COMPOSITIONS

RELATED APPLICATIONS

This application is the National Phase of International Application No. PCT/US05/44670 filed Dec. 9, 2005 and claims priority based upon U.S. Provisional Application No. 60/634,890 filed on Dec. 13, 2004.

FIELD OF THE INVENTION

This invention relates to metal-containing compositions useful in manufacturing films and other articles with enhanced refractive index, optical clarity, thermal properties, chemical resistance, scratch resistance, adhesion and surface hardness. Such films and articles find applications in the area of light management films, articles and devices.

BACKGROUND TO THE INVENTION

Polymeric films and articles are extensively used in optical applications. One major problem with the use of such materials is reflective losses at the substrate/air interface, resulting in lower intensity of transmitted light. Issues of reflective losses across multiple interfaces can be addressed by adjusting the refractive indices of the films. One such example is cured film of urethane acrylate resin, which is widely used as protective coat in variety of applications involving display devices. Although, urethane protective coats have excellent transparency, hardness and scratch resistance, it is difficult to modify their refractive indices due to limited choices of building materials that are available for optical applications. An alternative means of modifying refractive index is to use small amounts of miscible additives, which do not alter other fundamental properties such as transparency, hardness and scratch resistance.

High refractive index values of metal compounds make them ideal candidates as additives to boost refractive indices of organic polymeric materials. For instance, Arpac et al. in U.S. Pat. No. 6,291,070 describe use of several nanoscale inorganic particles to create molded articles of varying refractive indices. Practical utility of inorganic particles in boosting refractive index is greatly restricted by the limited compatibility between such particles and organic polymeric matrices. Processes such as "micronization" can produce nanoparticies with relatively high dispersion to some extent but there is a practical limit to the size achievable economically by "micronization". For applications where transparency is important, the particle size must be smaller than the wavelength of the light in order for the material to be transparent. Sol-gel or solution-colloidal phase reactions are alternative means of generating very fine particles of metal oxides, but the nature of the small particles often leads to their agglomeration, causing increased hazing and scattering of a transparent article over time.

Issues of agglomeration of fine particles can be addressed through chemical surface reactions. For instance, inorganic particles, described by Arpac et al. in U.S. Pat. No. 6,291,070, were surface-treated with hydrolysable silane containing at least one polymerizable and/or polycondensable group. Chisholm et al. in U.S. Pat. No. 6,844,950 also describe the use of nanoparticles of ethylenically unsaturated compounds of zirconium and titanium. Similarly, Arney et al. in U.S. Pat. No. 6,432,526 describes the use of metal oxides modified with dispersing aids for improved compatibilization with organic materials. The main difficulty with this approach is that the actual nanoparticle compositions are changed by attaching these modifying species to them. Moreover, the metal concentration in any subsequent formulations is decreased by the presence of these organic functional groups. Most critically, the issues of hazing and light scattering after the article has been exposed to prolonged storage are not completely solved due to the limited shelf life of surface modified metal particles. Designing metal-containing compositions with homogeneous dispersion in the final article or the polymerizable fluid and long shelf life stability, therefore, continues to be a challenge.

Use of discrete metal compounds as processing aids and curing agents in the processing of certain types of elastomers and some dental compositions is known. For instance, Nagel et al in U.S. Pat. No. 6,194,504 describe the use of metal salts of acrylic acid as processing aids to improve dispersion of such curing additives in butadiene, natural rubber and EPDM based elastomers. Fabian in U.S. Pat. No. 6,553,169 and Shustack et al. in U.S. Pat. No. 6,656,990 describe the use of less than 0.5 weight-percent of titanates and zirconates as energy curable coupling agents to improve adhesive properties and dispersion of pigments. Similarly, use of zirconium-based acrylate as coupling agent between amorphous calcium phosphate and polymeric matrices has been reported by Skrtic et al. [Biomaterials 24 (2003) 2443-2449]. None of the art reported above teaches how to create an optically clear film or article with excellent physical and mechanical properties, especially ones with high refractive index, and improved shelf life from compositions containing discrete metal-containing functional precursor units.

SUMMARY OF THE INVENTION

An objective of this invention is to provide novel metal-containing compositions. They are produced by combining discrete metal-containing functional precursor units. The metal-containing functional precursor units are soluble in organic solvents in which the prepolymers are also soluble. A further objective of this invention is to provide processes for combining these compositions reactively so as to produce films or articles. The metal-containing compositions of this invention are especially useful to produce films or articles with excellent optical clarity and shelf life stability.

In one embodiment this invention provides a composition formed by combining compounds comprising a metal-containing precursor unit (MU), a prepolymer unit (PU), and a catalyst or an initiator capable of inducing a combining reaction of ethylenically unsaturated groups of MU and PU. The compositions are optically clear as measured by the Transmittance Test. The compositions are useful in enhancing refractive index and yield films, composites, and other articles with excellent thermal properties, chemical resistance, scratch resistance, adhesion, and surface hardness.

The metal-containing precursor unit (MU) of this invention can be of two types: MU1 and MU2. They can be used alone or in combination. MU1 and MU2 contain at least one ethylenically unsaturated functional group. MU2 is a polyhedral oligometallasilasesquioxane (POMSS) as defined below, and MU1 is represented by Structure I:

$$MA_wB_xC_y \qquad \text{Structure I}$$

where M comprises a metal with formal valency of 0-5 such as Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y. The A, B, and C groups may be selected to impart compatibility with a variety of prepolymers and organic solvents and to form an optically clear film or article. Here w is 1-5, and x is 0-4, and y is 0-4 such that w+x+y equals 1-5.

A comprises

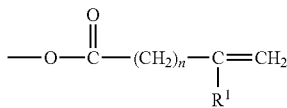
Structure II where $R^1$ is a H atom, an alkyl group containing 1-8 carbon atoms, a group containing a halogen atom, or a hydroxyalkyl group, and n is 0-6. Examples of A in MU1 are shown in Structures IIA, IIB, and IIC

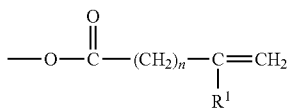
Structure IIA

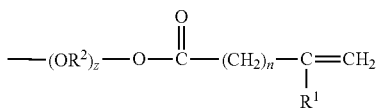
Structure IIB

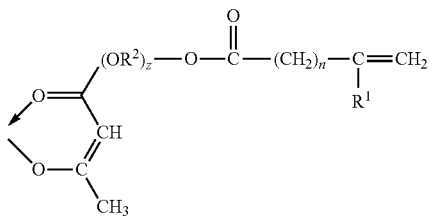
Structure IIC where $R^1$ represents a H atom, an alkyl group containing 1-8 carbon atoms, a group containing a halogen atom, or a hydroxyalkyl group; $R^2$ represents an alkyl group, or a substituted or unsubstituted aryl group; z is 1-3; and n is 0-6 (where 0 denotes a direct bond).

B and C in Structure I can be selected individually or in combination from oxygen, sulfur, a halogen atom, or —$OR^3$ where $R^3$ represents an alkyl group, an alkenyl group, an alkyl ether group, an aminoalkyl group, a haloalkyl group, or a thioalkyl group, or a substituted or unsubstituted aryl group.

An example of MU1 can be $Zr(O)(CH_2CO_2C(CH_3))_2$, zirconyl dimethacrylate, in which case A is methacrylate, B is oxygen, w=2, x=1, y=0, and w+x+y=3.

The POMSS materials, MU2, are cage-compounds comprising Si, O and metal atoms. Typically, POMSS compounds comprise both metal oxides and silicon oxides. They are represented by Structure III and Structure IV, respectively:

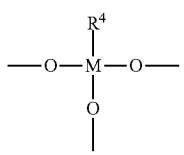
Structure III

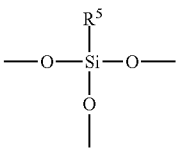
Structure IV where M is a four-coordinate metal, $R^4$ and $R^5$ independently represent an alkyl group, an alkyl ether group, a group containing a halogen atom, a substituted or unsubstituted silyl group, a substituted or unsubstituted aryl group, a substituted or unsubstituted aryl ether group, a hydroxyl group, a thiol group, a carboxylic group, an amino group, or an ethylenically unsaturated functional group such as a (meth)acryloyl group, a substituted or unsubstituted styryl group, a vinyl group, or an allyl group. $R^4$ and $R^5$ groups are selected to contain at least two ethylenically unsaturated functional groups if used individually or at least one ethylenically unsaturated functional group if used in combination with MU1.

The term prepolymer unit (PU) refers to a monomer unit or an oligomer, where oligomer refers to a combination of monomer units joined together. The prepolymer may contain many monomeric units and is capable of further reactions to be incorporated in the final material. The PU contains terminal and/or pendant ethylenically unsaturated groups, which can participate in combining reactions, with metal-containing precursor units (MU). Examples of such terminal and pendant groups are a vinyl group, an allyl group, and a (meth)acryloyl group. The monomer units of the PU may be selected to be compatible with MU and to form an optically clear film or article. The average molecular weight of the PU is between 70 and $10^7$ Daltons. An example of PU can be diurethane dimethacrylate supplied by Aldrich Chemical Company (Catalog No. 436909).

Another embodiment is a composition comprising MU, PU and a catalyst or an initiator capable of inducing a combining reaction of ethylenically unsaturated groups of the MU and the PU, wherein the composition, after reaction, is optically clear as measured by the Transmittance Test. An important criterion in the selection of the MU and the PU for the metal containing composition of this invention is that they are compatible with each other, that is, they are capable of undergoing a combining reaction with each other and the composition forms an optically clear film or article as measured by the Transmittance Test.

The catalyst or initiator used in the composition is a compound capable of catalyzing combining reactions of the MU and the PU, usually in the presence of added light or heat. An example of photoinitiator is 1-hydroxy-cyclohexyl-phenyl-ketone, (Irgacure 184) from Ciba Specialty Chemicals.

The composition may further include a non-aqueous solvent and/or an additive. The composition may further comprise a co-monomer with only one ethylenically unsaturated functional group.

In another embodiment, this invention provides compositions comprising metal-containing precursor unit (MU) and a catalyst or an initiator capable of inducing combining reactions of ethylenically unsaturated groups of MU units to form an optically clear film or article. MU1 and MU2 can be used alone or in combination with the proviso that at least a portion of MU contains at least two ethylenically unsaturated functional groups.

The present invention also includes a method of forming a composition comprising preparing a mixture comprising a metal containing precursor unit (MU), a prepolymer unit (PU), and a catalyst/initiator under conditions sufficient to induce a combining reaction of ethylenically unsaturated groups of MU and PU. Another embodiment is a method of forming a composition comprising preparing a mixture comprising MU and a catalyst or initiator under conditions sufficient to induce a combining reaction of ethylenically unsaturated groups of MU units. A further embodiment is a method of making an article comprising preparing a mixture comprising MU, PU and a catalyst or initiator under conditions sufficient to induce a combining reaction of ethylenically unsaturated groups of MU and PU. Another embodiment is a method of making an article comprising preparing a mixture comprising MU and a catalyst or initiator under conditions sufficient to induce a combining reaction of ethylenically unsaturated groups of MU units.

The formulations of this invention are stable i.e. they do not show any sign of separation for at least 2 months upon storage at room temperature (23° C.). In contrast compositions containing metal oxides as fine particles are not stable.

The invention also provides a method of using the composition to form an optically clear film or article. The film can be part of a laminate.

The invention further includes a coated, a laminated, or a molded article formed by the composition. The composition and the film, or the laminate or the molded article formed therefrom usually has an index of refraction in the range of 1.4 to 1.8 in the 400-700 nm range of light and 1.4 to 2.4 in the 150-400 nm range of light. The cured film typically has at least 90% retention of optical clarity. In many cases, the composition has a transmittance of at least 95% as measured by the Transmittance Test.

Further scope of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Definitions of Terms Used

The term "combining reaction" as used herein refers to polymerization and/or crosslinking reactions of ethylenically unsaturated functional groups. The crosslinking is usually chemical crosslinking but in some cases can be physical crosslinking. Combining reactions can take place with MU and MU, MU and PU, and PU and PU (the latter two cases can only occur when PU is present in the composition).

The term "cured" as used herein refers to a composition, film or article that has been crosslinked. A "fully cured" composition, film or article does not show any solubility in acetone as determined by mechanically rubbing a cotton swab soaked in acetone. As used herein, a "partially cured" composition, film or article shows some solubility in acetone as determined by mechanically rubbing a cotton swab soaked in acetone.

As used herein, the term "optically clear" refers to a composition which would have greater than 90% transmittance of light in the 400-700 nm range if it were formed into a film having a thickness of 4-6 μm. Many of the compositions disclosed herein have a transmittance of at least 95%. In a number of cases, the transmittance is at least 99%.

In the Transmittance Test, the composition is coated onto a Luminor T PET film from Toray (75 μm thick) with a wire-wound coater (3 mil diameter), Catalog No. AR-4103 from BYK Gardner, to a wet film thickness of 4-6 μm and the transmittance is measured by a UVN is spectrophotometer in the 400-700 nm range. Transmittance can be measured before or after curing. Usually, transmittance measurements taken before and after curing are substantially the same.

The term "retention of optical clarity" refers to a cured film or article having at least 90% of its original % transmittance as measured by the Transmittance Test after two months of storage at 23° C. with relative humidity 50-65% under ambient conditions of light.

In one embodiment, this invention provides compositions comprising a metal-containing precursor unit (MU), a prepolymer unit (PU), and a catalyst or initiator capable of inducing combining reactions of ethylenically unsaturated groups of MU and PU to form an optically clear film or article. Another embodiment is a composition formed by combining compounds comprising a metal-containing precursor unit (MU), a prepolymer unit (PU), and a catalyst or initiator capable of inducing combining reactions of ethylenically unsaturated groups of MU and PU. An important criterion in the selection of the MU and the PU for the metal containing composition of this invention is that they are compatible with each other as determined by the fact that the composition forms an optically clear film or article before curing. The metal-containing compositions are also useful in enhancing refractive index. Films and articles formed by the compositions have excellent optical and thermal properties, chemical resistance, scratch resistance, and surface hardness.

The metal-containing precursor unit (MU) can be selected individually or in combination from precursor units MU1 and MU2. MU2 is a polyhedral oligometallasilasesquioxane (POMSS) and MU1 is represented by Structure I:

Structure I where M comprises a metal with valency of 1-5 such as Zr, Hf, Ge, Ti, Pb, Gd, Sn, Zn, Ni, Na, Li, K, Ce, Nb, Eu, In, Al, Fe, Mn, Nd, Cu, Sb, Mg, Ag, and Y The A, B, and C groups may be selected to impart compatibility with a variety of prepolymers and organic solvents and to form an optically clear film or article. Here w is 1-5, x is 0-4, and y is 0-4 such that w+x+y equals 1-5.

In Structure I, A is represented by Structures IIA, IIB, or IIC

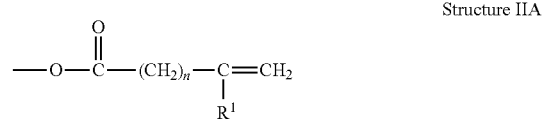

Structure IIA

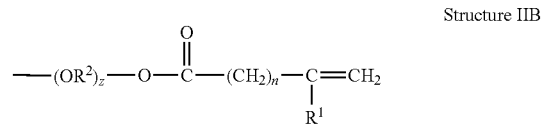

Structure IIB

Structure IIC

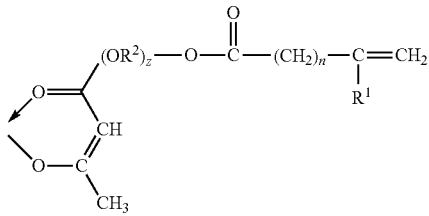

where $R^1$ represents a H atom, an alkyl group containing 1-8 carbon atoms, a group containing a halogen atom, or a hydroxyalkyl group; $R^2$ represents an alkyl group or a substituted or unsubstituted aryl group; z is 1-3; and n is 0-6 (where 0 denotes a direct bond).

B and C are selected individually or in combination from oxygen, sulfur, a halogen atom, or —$OR^3$ where $R^3$ represents an alkyl group, a group containing a halogen atom, or a substituted or unsubstituted aryl group, Structure I can be further described by Structures V through X.

Structure V

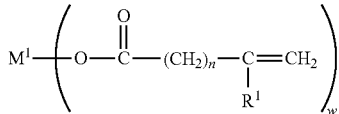

$M^1$ in Structure V comprises a metal with valency of 1-5, $R^1$ and n are as defined in Structures IIA, IIB, or IIC, and w is as defined in Structure I. Examples of $M^1$ in Structure V are Zr, Hf, Ge, Ti, Pb, Sn, Zn, Ni, Na, Li, Gd, K, Ce, Nb, Eu, In, Al, Fe, Mn, Nd, Cu, Sb, Mg, Ag, and Y. Preferred examples of $M^1$ are Zr, Hf, Ge, Ti, Nb, Gd, Al, In, Sb, Sn, Ag and Y. Examples of $R^1$ are H atom, a methyl, a chloromethyl, a trifluoromethyl, a hydroxymethyl, and a hydroxyethyl. Preferred examples of $R^1$ are H atom and a methyl and n is 0-1.

Preferred examples of Structure V are zirconium, hafnium, titanium, and germanium compounds of (meth)acrylates and vinylacetates. The most preferred example is zirconium (meth)acrylate.

Structure VI

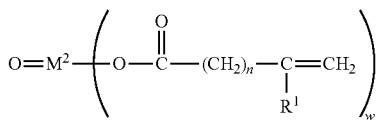

$M^2$ in structure VI is any four-coordinate metal such as Ti, Hf, or Zr; w is 2; and $R^1$ and n are as defined in Structures IIA, IIB, or IIC. Examples of $R^1$ are H atom, methyl, chloromethyl, trifluoromethyl, hydroxymethyl, and hydroxyethyl. Preferred examples of $R^1$ are H atom and methyl and n is 0 or 1. Specific examples of Structure VI are zirconyl, titanium oxide, and hafnium oxide compounds of dimethacrylate and di(vinylacetate). The most preferred example is zirconyl dimethacrylate.

Structure VII

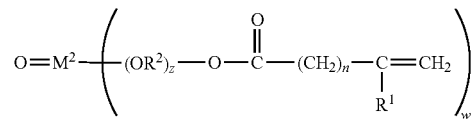

$M^2$ and w in Structure VII are as defined in Structure VI; and n, z, $R^1$, and $R^2$ are as defined in Structures IIA, IIB, or IIC. Examples of $R^1$ are H atom, methyl, chloromethyl, trifluoromethyl, hydroxymethyl, and hydroxyethyl. Preferred examples of $R^1$ are H atom and methyl and n is 0 or 1. Examples of $R^2$ are ethylene, 1-methyl ethylene, propylene, 2,2-dimethoxypropylene, butylene, and phenyl. Preferred examples of $R^2$ are ethylene, 1-methyl ethylene, and 2,2-dimethoxypropylene and z is 1 or 2. Specific examples of Structure VII are zirconyl, titanium oxide, and hafnium oxide compounds of di(2-ethoxy(meth)acrylate), di(2-ethoxyvinylacetate), bis(3-(2,2-dimethoxypropoxy)(meth)acrylate), and bis(3-(2,2-dimethoxypropoxy)vinylacetate).

Structure VIII

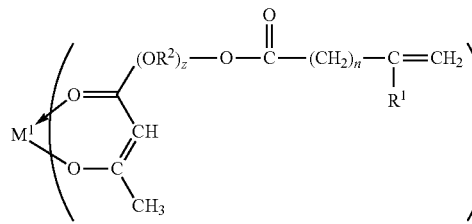

$M^1$ in Structure VIII is as defined in Structure V; w is as defined in Structure I; and n, z, $R^1$, and $R^2$ are as defined in Structures IIA, IIB, or IIC. Examples of $R^1$ are H atom, methyl, chloromethyl, trifluoromethyl, hydroxymethyl, and hydroxyethyl. Preferred examples of $R^1$ are H atom and methyl. Examples of $R^2$ are ethylene, 1-methyl ethylene, 2,2-dimethoxypropylene, propylene, butylene, and phenyl. Preferred examples of $R^2$ are ethylene, 2,2-dimethoxypropylene, and 1-methyl ethylene, n is 0-1, and z is 1 or 2.

Specific examples of Structure VIII are zirconium, hafnium, titanium, and germanium compounds of (meth)acryloxyethylacetoacetate, and vinylacetoxyethylacetoacetate.

Structure IX

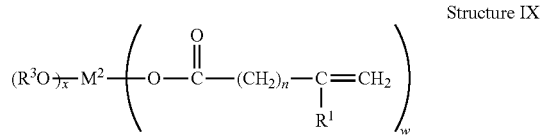

$M^2$ in Structure IX is as defined in Structure VI; $R^1$ and n are as defined in Structures IIA, IIB, or IIC; w is 1-3 and x is 1-3 such that w+x equals 4. $R^3$ represents an alkyl group, a group containing a halogen atom, or a substituted or unsubstituted aryl group. Examples of $R^1$ are H atom, methyl, chloromethyl, trifluoromethyl, hydroxymethyl, and hydroxyethyl. Preferred examples of $R^1$ are H atom and methyl and n is 0-1. Examples of $R^3$ are methyl, ethyl, propyl, 1-methylethyl, butyl, 2-methylpropyl, 1,1-dimethylethyl, phenyl, and cyclohexyl. Preferred examples of $R^3$ are ethyl, propyl, 1-methylethyl, butyl, 2-methylpropyl, and 1,1-dimethylethyl.

Specific examples of Structure IX are zirconium, hafnium, titanium, and germanium compounds of mono-, di- or tri-(meth)acrylate or vinylacetate and mono-, di- or tri-alkoxides. The preferred examples of Structure IX are zirconium diacrylate dibutoxide and titanium methacrylate triisopropoxide.

Structure X

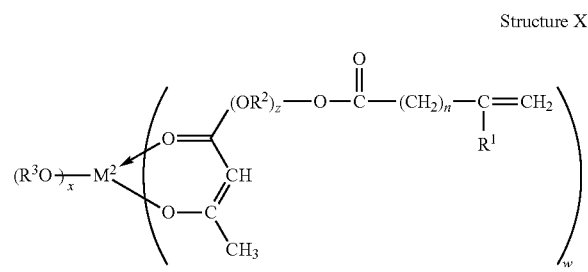

$M^2$ in Structure X is as defined in Structure VI; n, z, $R^1$, and $R^2$ are as defined in Structures IIA, IIB, or IIC; $R^3$ is as defined in Structure IX; w is 1-3 and x is 1-3 such that w+x equals 4. Examples of $R^1$ are H atom, methyl, chloromethyl, trifluoromethyl, hydroxymethyl, and hydroxyethyl. Preferred examples of $R^1$ are H atom and methyl and n is 0 or 1. z is 1 or 2. Examples of $R^2$ are ethylene, 1-methyl ethylene, 2,2-dimethoxypropylene, propylene, butylene, and phenyl. Preferred examples of $R^2$ are ethylene, 2,2-dimethoxypropylene, and 1-methyl ethylene and y is 1 or 2. Examples of $R^3$ are methyl, ethyl, propyl, 1-methylethyl, butyl, 2-methylpropyl, 1,1-dimethylethyl, phenyl, and cyclohexyl. Preferred examples of $R^3$ are ethyl, propyl, 1-methylethyl, butyl, 2-methylpropyl, and 1,1-dimethylethyl.

Examples of Structure X are zirconium, hafnium, titanium, and germanium alkoxide compounds of mono-, di- or tri-(meth)acryloxy- or vinylacetoxy-acetoacetate. A preferred example of Structure X is titanium methacryloxyethylacetoacetate triisopropoxide.

The polyhedral oligometallasilasesquioxane (POMSS) of MU2 are cage-compounds comprising Si, O and metal atoms. Typically, POMSS compounds comprise both metal oxides and silicon oxides represented by Structure III and Structure IV, respectively:

Structure III

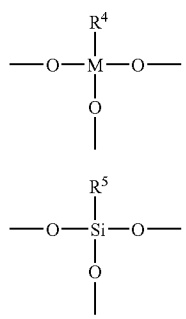

Structure IV where M is a four-coordinate metal, $R^4$ and $R^5$ independently represent an alkyl group, an alkyl ether group, a group containing a halogen atom, a substituted or unsubstituted silyl group, a substituted or unsubstituted aryl group, a substituted or unsubstituted aryl ether group, a hydroxyl group, a thiol group, a carboxylic group, an amino group, or an ethylenically unsaturated functional group such as a (meth)acryloyl group, a substituted or unsubstituted styryl group, a vinyl group, or an allyl group. $R^4$ and $R^5$ groups are selected to contain at least two ethylenically unsaturated functional groups if used individually or at least one ethylenically unsaturated functional group if used in combination with MU1. POMSS can be closed or open cages. The term "closed" means a siloxane/metal cage compound where each metal atom of a cage is linked to no more than three Si atoms of the same cage through oxygen atoms and each Si atom of the cage is linked to no more than three metal atoms of the same cage through oxygen atoms. The term "open" means a siloxane/metal cage compound similar to a closed polyhedral oligometallasilasesquioxane" except where two or three Si or metal atoms of the cage are each linked to no more than two other metal or Si atoms, respectively, of the same cage through oxygen atoms.

The polyhedral oligometallasilasesquioxane can be further described by structures XI through XIII.

Structure XI

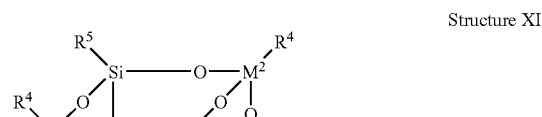

Structure XII

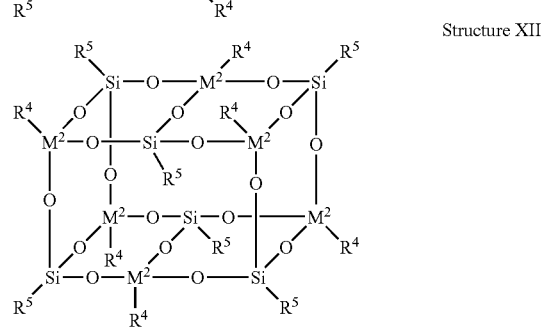

Structure XIII

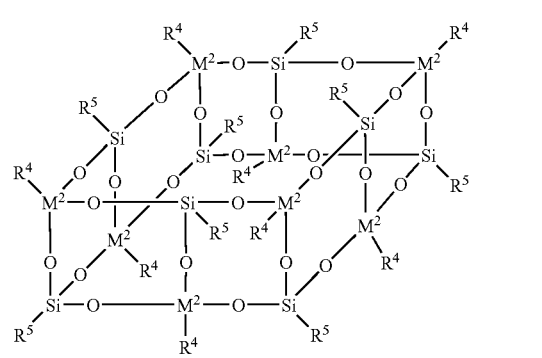

$M^2$ in Structures XI, XII, and XIII is a four-coordinate metal such as Ti, Zr, Hf, or Ge; $R^4$ and $R^5$ are defined as in Structures III and IV. Examples of $R^4$ and $R^5$ are methyl, ethyl, propyl, 1-methylethyl, butyl, 2-methylpropyl, 1,1-dimethylethyl, phenyl, styryl, cyclohexyl, methoxy, ethoxy, propoxy, 1-methylethoxy, butoxy, 2-methylpropoxy, 1,1-dimethylethoxy, substituted and unsubstituted phenoxy, (meth) acryloxy, substituted and unsubstituted aniline, allyl, vinyl, and hydroxyl. Preferred examples of $R^4$ and $R^5$ are acryloxy, methacryloxy, ethoxy, 1-methylethoxy, substituted and unsubstituted phenoxy, substituted and unsubstituted aniline, and hydroxyl.

Examples of Structure XI, XII, and XIII are titanasilasesquioxanes, zirconasilasesquioxanes, hafnasilasesquioxanes, or germanasilasesquioxanes. Preparation of Such Molecules is Described by R. Murugavel, V. Chandrasekhar, and H. W. Roesky, *Acc. Chem. Res.,* 1996, 29, 183-189 and is incorporated herein as reference. A preferred example of MU2 of this invention is described by Structure XIV, which is prepared by reacting polymerizable metal carboxylate precursors such as titanium acrylate with a structurally hindered trihydroxy silane such as, 2,4,6-tri-tertiary-butylphenoxy trihydroxysilane as shown in Scheme I.

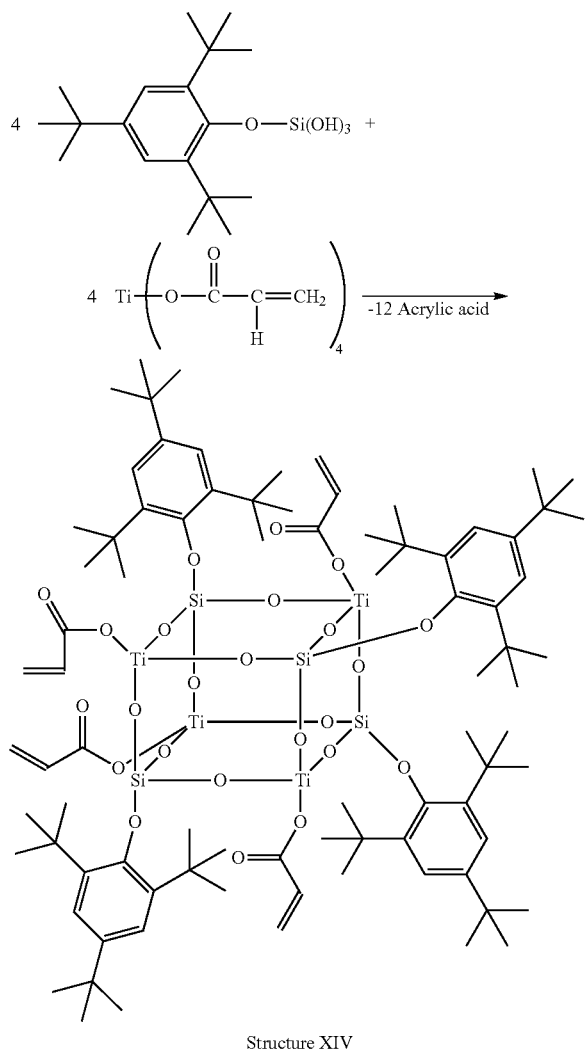

Scheme 1

Structure XIV

A similar reaction scheme is followed to prepare zirconium, hafnium and germanium derivatives of Structure XIV. The unique advantage of this cage structure over the compounds described by R. Murugavel et al. is that they contain acryloxy groups capable of further combining reactions with a PU. Role of 2,4,6-tri-tertiary-butylphenoxyl groups is to impart compatibility with organic solvents as well as PU groups. The metal atoms are separated from each other by siloxane bonds, preventing agglomeration of metal groups as in the case of metal oxides; hence, compositions comprising cage compounds as in Structure XIV form an optically clear film or article.

The term prepolymer unit (PU) refers to a monomer unit or an oligomer where oligomer refers to combination of monomer units joined together. The prepolymer may contain many monomer units and is capable of further reactions to be incorporated in the final material. Examples of such monomer units/oligomers are based on one or more of the following types: acrylate, ester, vinyl alcohol, urethane, urea, carbonate, pyranose, siloxane, urea-formaldehyde and melamine-formaldehyde. The PU contains at least two terminal and/or pendant ethylenically unsaturated groups. These can participate in combining reactions with metal-containing precursor units (MU). Examples of such terminal and pendant groups are a vinyl group, an allyl group, and a (meth)acryloyl group. The monomer units of the PU may be selected to be compatible with MU so that the composition forms an optically clear film or article before curing.

Specific examples of prepolymer unit (PU) include urethane acrylate oligomer. The term urethane acrylate oligomer refers to a class of compounds that contain urethane linkages and have (meth)acrylate functional groups such as urethane multi(meth)acrylate, multiurethane (meth)acrylate, and multiurethane multi(meth)acrylate. Types of urethane (meth) acrylate oligomers have been described by Coady et al. in U.S. Pat. No. 4,608,409 and by Chisholm et al. in U.S. Pat. No. 6,844,950 and are incorporated herein as references. Other specific examples of prepolymer unit (PU) include 1,6-hexanediol di(meth)acrylate, tetraethyleneglycol di(meth)acrylate, divinylbenzene, ethoxylated bisphenol-A-di(meth)acrylate, diethylene glycol bis(allyl carbonate), trimethylolpropane tri(meth)acrylate, ditrimethylolpropane tetra(meth)acrylate, pentaerythritol tri(meth)acrylate, pentaerythritol tetra(meth)acrylate, dipentaerythritol penta-/hexa-(meth)acrylate, isocyanurate tri(meth)acrylate, bis(2-hydroxyethyl)-isocyanurate di(meth)acrylate, 1,3-butanediol tri(meth)acrylate, 1,4-butanediol tri(meth)acrylate, neopentyl glycol di(meth)acrylate, and (meth)acrylate modified-urea-formaldehyde, melamine-formaldehyde and cellulose.

A non-limiting example of a preferred prepolymer unit is urethane acrylate oligomer, commercially available from Sartomer Company.

The prepolymer often has an average molecular weight between 70 and $10^7$ Daltons. A more preferred upper limit of molecular weight is $10^6$ Daltons. The most preferred upper limit of molecular weight is $10^5$ Daltons.

Preferably the composition comprises between about 5-90 weight % (on the basis of total solids) of metal-containing precursor unit (MU).

In another embodiment, this invention provides compositions comprising metal-containing precursor unit (MU) and a catalyst or an initiator capable of inducing combining reactions of ethylenically unsaturated groups of two or more MUs to form an optically clear film or article. Typically, the composition is optically clear even before it is formed into a film or article (before curing) and remains optically clear when it is cured. MU1 and MU2 can be used individually or in combination with the proviso that at least a portion of MU contains at least two ethylenically unsaturated functional groups.

The composition may further comprise mono-functional ethylenically unsaturated monomers (M). For instance, an acrylate monomer may be used to improve the physical properties of the final film or article. The acrylate monomer is incorporated into the film or article by combining reactions with MU and or PU.

The novel invention further comprises a catalyst or an initiator capable of inducing a combining reaction in the presence of light or heat. Examples of photoinitiators include but are not limited to 2-hydroxy-2-methyl-1-phenylpropan-1-one, 1-hydroxycyclohexyl phenyl ketone (Irgacure 184 from Ciba Specialty Chemical), a blend of 1-hydroxycyclohexylphenylketone and benzophenone (Irgacure 500 from Ciba Specialty Chemical), 2,4,4-trimethylpentyl phosphine oxide (Irgacure 1800, 1850, and 1700 from Ciba Specialty Chemical), 2,2-dimethoxyl-2-acetophenone (Irgacure 651 from Ciba Specialty Chemical), bis(2,4,6-trimethyl benzoyl) phenyhl-phosphine oxide (Irgacure 819 from Ciba Specialty Chemical), 2-methyl-1-[4-(methylthio)phenyl]-2-morphorinopropane-1-on (Irgacure 907), (2,4,6-trimethylbenzoyl)diphenyl phosphine oxide (Lucerin TPO from BASF), ethoxy(2,4,6-trimethylbenzoyl)pheny phosphine oxide (Lucerin TPO-L from BASF), a blend of phosphine oxide, α-hydroxy ketone and a benzophenone derivative (ESACURE KT046 from Sartomer), 2-hydroxy-2-methyl-1-phenylpropane-1-on (Darocur 1173 from Merck), benzophenone, 2-chlorothioxanthone, 2-methylthioxanthone, 2-isopropylthioxanthone, benzodimethyl ketal, 1,1,1-trichloroacetophenone, diethoxyacetophenone, m-chloroacetophenone, propiophenone, anthraquinone, and dibenzosuberone.

Examples of catalysts or initiators useful in inducing a combining reaction the presence of heat include but are not limited to organic peroxides such as benzoyl peroxide, diacylperoxides, peroxydicarbonates, alkylperesters, alkyl peroxides, perketals, ketoneperoxides, and alkylhydroperoxides as well as azo compounds such as azobisisobutyronitrile and 1,1'-azobis(cyclohexanecarbonitrile).

The catalyst or initiator is typically employed in the amounts of about 0.0001 to 20% by weight and more preferably about 1% to 10%. The amount of catalyst or initiator is based on the combined weights of MU, PU, and M.

The composition may further comprise a suitable solvent. The choice of solvent for the formulation and the concentration thereof depends principally on the type of functionalities incorporated in the metal-containing precursor unit (MU) and prepolymer unit (PU) along with the catalyst or initiator and the coating method. The solvent should be inert, should dissolve or uniformly disperse all the components in the composition, should not undergo any chemical reaction with the components, and should be removable on drying after coating. The solvent is generally present in the composition in an amount of from about 1 to about 90% by weight, and typically is present in the composition in an amount of 20-60 weight %. Suitable solvents for the composition may include non-aqueous solvents such as ketones, ethers, esters and alcohols. Examples of ketones, ethers, and esters include 2-butanone, 3-methyl-2-butanone, 2-heptanone, cyclopentanone, cyclohexanone, 2-methoxy-1-propylene acetate, 2-methoxyethanol, 2-ethoxyethanol, 2-ethoxyethyl acetate, I-methoxy-2-propyl acetate, 1,2-dimethoxy ethane ethyl acetate, cellosolve acetate, methyl lactate, ethyl lactate, n-butyl acetate, methyl pyruvate, ethyl pyruvate, methyl 3-methoxypropionate, ethyl 3-methoxypropionate, N-methyl-2-pyrrolidone, 1,4-dioxane, ethylene glycol monoisopropyl ether, diethylene glycol monoethyl ether, diethylene glycol monomethyl ether, diethylene glycol dimethyl ether, and the like. Examples of alcohol solvents include methanol, ethanol, 1-propanol, 2-propanol, butanol, and the like.

The composition may further comprise conventional additives, such as dyes, adhesion promoters, buffers, sensitizers, stabilizers, anti-oxidants, colorants, and surfactants. Similarly, a dye may be used to improve the sensitivity of the coating to actinic rays required for the purpose of curing the film.

Examples of antioxidants include but are not limited to hindered phenols (Irganox 1010 from Ciba Specialty Chemical), sulfides, organoboron compounds, and N,N'-hexamethylenebis(3,5-di-tert-butyl-4-hydroxyhydrocinnamamide) (Irganox 1098 from Ciba Specialty Chemical).

Examples of photostabilizers include but are not limited to poly[(6-morpholino-s-triazine-2,4-diyl)[(2,2,6,6-tetramethyl-4-piperidyl)imino]-hexamethylene[2,2,6,6-tetramethyl-4-piperidyl]imino (Cyasorb UV-3346 from Cytec).

Examples of free radical scavengers include but are not limited to oxygen, hindered amine light stabilizers, hindered phenols, 2,2,6,6-tetramethyl-1-piperidinyloxy free radical (TEMPO), and nitrones.

A person skilled in the art will be able to choose the appropriate desired additive and its concentration.

Another embodiment is a process for preparing a formulation for the composition by mixing the metal containing precursor unit (MU), the prepolymer unit (PU), and the suitable catalyst/initiator compound along with a suitable solvent and any conventional additive.

Another embodiment is a process for applying or casting the composition in the form of a film or a three-dimensional article and curing said film or article. The composition is applied uniformly onto a suitable substrate, such as metal, plastic, wood, paper, glass, and ceramic, by known coating methods. For example, the coatings may be applied by dipping (or dip coating), knife coating, lamination, brushing, spraying, spin-coating, die coating, micro-gravure coating, cast-transfer or reverse-roll coating. After the coating operation, the solvent is generally removed by drying. The drying step is typically a heating step where the coating and substrate are heated to a temperature of about 50° C. to 150° C. for about a few seconds to a few minutes; preferably for about 5 seconds to 30 minutes depending on the thickness, the heating element, and end use of the coating. The thickness range of the dried coating generally covers values less than 10 mm.

A three-dimensional article can be cast from the composition by employing a suitable molding technique.

For the production of cured films or articles, the cast film or article can be exposed to a high energy radiation source. Radiation sources which can be used are all sources that emit radiation to which the suitable catalyst or initiator is sensitive. Examples include high pressure mercury lamp, excimer lasers, electron beams, and x-rays sources. Total exposure time vary from about 5 seconds to 30 minutes depending on intensity of the radiation, thickness of coating, nature of the metal-containing precursor unit (MU) and the prepolymer unit (PU), and sensitivity of the catalyst or initiator used. The composition may be exposed to radiation whether it is in a solvent-containing state or in a solvent-free state after evaporating the solvent fraction. A fully cured film or article does not show any solubility in acetone as determined by mechanically rubbing a cotton swab soaked in acetone. Depending on the application, a post-curing bake may be required.

Alternatively, a cured film or article can be produced by heating the cast film or article to a temperature of about 50° C. to 300° C. for about a few seconds to a few minutes; preferably for about 5 seconds to 30 minutes depending on the thickness of coating, nature of the metal-containing precursor (MU) and the prepolymer unit (PU), and efficiency of the catalyst or initiator.

Another embodiment is an optically clear film or article. The film or article typically has transparency greater than ninety percent, an index of refraction in the range of 1.4 to 1.8 in the 400-700 nm range of light and 1.4 to 2.4 in the 150-400 nm range of light. Unless modified with a dye, the film and article of this invention show no coloration in the visible range of light. The cured film has good retention of optical clarity and does not change color upon storage. The cured film also shows excellent adhesion to a variety of substrates such as silicon, metal, wood, and other plastics or films such as polyethylene terephthalate (PET) or triacetyl cellulose (TAC) to form laminates and composites. The cured films and the articles also show excellent hardness, scratch resistance, and resistance to most of organic solvents.

EXAMPLES

The invention is further illustrated by, but not limited to, the following examples.

Preparative Example 1

In a 250-mL amber bottle, urethane acrylate oligomer, U1, Catalog No. CN9010 from Sartomer Company (90 g) was dissolved in ethyl acetate (60 g). The resulting mixture was homogeneous and clear after 20 minutes of rolling on a two mill roller at maximum speed.

Comparative Example 1

An ethyl acetate solution of urethane acrylate oligomer, U1, as prepared in Preparative Example 1 (1.52 g) was added to a 2-dram amber vial containing 1-[4-(phenylthio)phenyl]-2-(O-benzoyloxime) 1,2-octanedione, Irgacure OXE-01 from Ciba Specialty Chemicals (0.05 g). Additional ethyl acetate (0.71 g) was added to adjust the concentration to 40% solids. The resulting mixture was homogeneous after 5 minutes of mixing with a magnetic stir bar on a magnetic stirrer set to the maximum speed. The homogeneous and clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

Preparative Example 2

In a 2-dram amber vial, dipentaerythritol penta-/hexa-acrylate, Catalog No. 407283 from Aldrich Chemical Company (4.0 g), was dissolved in ethyl acetate (2.0 g). The resulting mixture was homogeneous and clear after 20 minutes of rolling on a two mill roller at maximum speed.

Comparative Example 2

An ethyl acetate solution of dipentaerythritol penta-/hexa-acrylate as prepared in Preparative Example 2 (1.98 g) was added to a 2-dram amber vial containing 1-hydroxy-cyclohexyl-phenyl-ketone, Irgacure 184 from Ciba Specialty Chemicals (0.06 g) and bis(2,4,6-trimethylbenzoyl)-phenylphosphineoxide, Irgacure 819 from Ciba Specialty Chemicals (0.02 g). Additional ethyl acetate (0.96 g) was added to adjust the concentration to 40% solids. The resulting mixture was homogeneous and clear after 5 minutes of agitation. The homogeneous solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

Preparative Example 3

In this preparative example, a stock solution of diurethane dimethacrylate was prepared along with photoinitiator. The stock solution prepared here is used in experiments of Comparative Example 3 and Examples 5 and 6. Accordingly, in a 15-mL amber bottle, a mixture of diurethane dimethacrylate, isomer mixture, Catalog No. 436909 from Aldrich Chemical Company (2.35 g) and bis(eta5-2,4-cyclopentadien-1-yl)bis[2,6-difluoro-3-(1H-pyrrol-1-yl)phenyl]titanium, Irgacure 784 from Ciba Specialty Chemicals (0.12 g), was dissolved in 2-butanone (3.53 g). The resulting mixture was homogeneous and clear after 5 minutes of mixing with a magnetic stir bar on a magnetic stirrer set to the maximum speed.

Comparative Example 3

A solution of diurethane dimethacrylate and photoinitiator in 2-butanone as prepared in Preparative Example 3 (0.98 g) was added to a 2-dram amber vial containing zirconium oxide nanopowder (20-30 nm particle size), Catalog No. 544760 from Aldrich Chemical Company (0.04 g). Additional 2-butanone (1.23 g) was added to the amber vial to adjust the concentration to 20% solids. The resulting dispersion was mixed for 5 minutes with a magnetic stir bar on a magnetic stirrer set to the maximum speed, but no homogeneous dispersion was achieved. An attempt was made to further homogenize the mixture by rolling it on a two mill roller for 12 hours, but solid settled within 10 minutes upon storage. The dispersion was filtered through 0.2 µm filter into a clean amber vial to remove insoluble material, but the solution remained hazy and more insoluble material appeared within one hour making the solution unstable for practical use.

Based on this observation, it was concluded that 20-30 nm zirconium oxide nanopowder was not dispersible or compatible with diurethane dimethacrylate hence, was not suitable for forming an optically clear film or article.

Example 1

An ethyl acetate solution of urethane acrylate oligomer, U1, as prepared in Preparative Example 1 (1.32 g) was added to a 2-dram amber vial containing zirconyl dimethacrylate, Catalog No. CXZR051 from Gelest, Inc. (0.09 g), and 1-[4-(phenylthio) phenyl]-2-(O-benzoyloxime) 1,2-octanedione, Irgacure OXE-01 from Ciba Specialty Chemicals (0.04 g). Additional ethyl acetate (0.74 g) was added to adjust the concentration to 40% solids. The resulting mixture was homogeneous and clear after 5 minutes of agitation. The clear solution was filtered through a 0.2 µm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, 10 weight percent of zirconyl dimethacrylate formed a homogeneous solution, which was stable for at least 6 months upon storage at RT (23° C.). Addition of zirconyl dimethacrylate did not result in any loss of transparency compared to cured film of urethane acrylate oligomer, U1, of Comparative Example 1, and resulted in an improved refractive index.

Preparative Example 4

In a 100-mL amber bottle, zirconyl dimethacrylate, Catalog No. CXZR051 from Gelest, Inc. (30 g), was dissolved in ethyl acetate (30 g). The resulting mixture was homogeneous and clear after 5 hours of rolling on a two mill roller at maximum speed.

Example 2

An ethyl acetate solution of urethane acrylate oligomer, U1, as prepared in Preparative Example 1 (1.40 g) and a solution of zirconyl dimethacrylate as prepared in Preparative Example 4 (0.72 g) were added to a 2-dram amber vial containing 1-hydroxy-cyclohexyl-phenyl-ketone, Irgacure 184 from Ciba Specialty Chemicals (0.06 g), and bis(2,4,6-trimethylbenzoyl)-phenylphosphineoxide, Irgacure 819 from Ciba Specialty Chemicals (0.01 g). Additional ethyl acetate (1.74 g) was added to adjust the concentration to 40% solids. The resulting mixture was homogeneous and clear after 5 minutes of agitation. The homogeneous solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, formulation containing 30 weight percent of zirconyl dimethacrylate formed a homogeneous solution, which was stable for at least 6 months upon storage at RT (23° C.). Addition of zirconyl dimethacrylate did not result in any loss of transparency compared to cured film of urethane acrylate oligomer, U1, of Comparative Example 1.

Example 3

An ethyl acetate solution of urethane acrylate oligomer, U1, as prepared in Preparative Example 1 (0.20 g) and solution of zirconyl dimethacrylate as prepared in Preparative Example 4 (2.14 g) were added to a 2-dram amber vial containing 1-hydroxy-cyclohexyl-phenyl-ketone, Irgacure 184 from Ciba Specialty Chemicals (0.06 g). Additional ethyl acetate (0.69 g) was added to adjust the concentration to 39% solids. The resulting mixture was homogeneous and clear after 5 minutes of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, formulation containing 90 weight percent of zirconyl dimethacrylate formed a homogeneous solution, which was stable for at least 6 months upon storage at RT (23° C.). Addition of zirconyl dimethacrylate did not result in any loss of transparency compared to cured film of urethane acrylate oligomer, U1, of Comparative Example 1.

Example 4

An ethyl acetate solution of dipentaerythritol penta-/hexa-acrylate as prepared in Preparative Example 2 (1.42 g) and an ethyl acetate solution of zirconyl dimethacrylate as prepared in Preparative Example 4 (0.74 g) were added to a 2-dram amber vial containing 1-hydroxy-cyclohexyl-phenyl-ketone, Irgacure 184 from Ciba Specialty Chemicals (0.06 g), and bis(2,4,6-trimethylbenzoyl)-phenylphosphineoxide, Irgacure 819 from Ciba Specialty Chemicals (0.02 g). Additional ethyl acetate (0.82 g) was added to adjust the concentration to 40% solids. The resulting mixture was homogeneous and clear after 5 minutes of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, 30 weight percent of zirconyl dimethacrylate formed a homogeneous solution with dipentaerythritol penta-/hexa-acrylate. The solution was stable for at least 6 months upon storage at RT (23° C.). Addition of zirconyl dimethacrylate did not result in any loss of transparency compared to cured film of dipentaerythritol penta-/hexa-methacrylate of Comparative Example 2.

Example 5

A solution of diurethane dimethacrylate and photoinitiator in 2-butanone as prepared in Preparative Example 3 (0.97 g) was added to a 2-dram amber vial containing zinc methacrylate, Catalog No. CXZN050 from Gelest, Inc. (0.04 g). Additional 2-butanone (1.24 g) was added to adjust concentration to 20% solids. Sample was agitated for 5 minutes, and then rolled for 12 hours. The resulting dispersion was mixed for 5 minutes with a magnetic stir bar on a magnetic stirrer set to the maximum speed. A portion of solid zinc methacrylate remained un-dissolved upon prolonged mixing of 4 hours. The resulting mixture was filtered through a 0.2 μm filter into a clean amber vial. The residue was about 3 weight percent. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its chemical resistance (see Table 1). The refractive index is reported in Table 2.

In this example, although a formulation containing 10 weight percent of zinc methacrylate did not form a homogeneous solution, a formulation containing 7 weight percent was stable for at least 2 months upon storage at RT (23° C.).

Example 6

In a 15-mL amber bottle, a mixture of diurethane dimethacrylate, isomer mixture, Catalog No. 436909 from Aldrich Chemical Company (0.60 g), 1-hydroxy-cyclohexyl-phenyl-ketone, Irgacure 184 from Ciba Specialty Chemicals (0.02 g), and titanium methacrylate triisopropoxide, Catalog No. AKT877 from Gelest, Inc. (0.07 g), were dissolved in 2-butanone (1.45 g). Additional 2-butanone (1.31 g) was added to adjust the concentration to 20% solids. The resulting mixture was homogeneous and clear after 5 minutes of agitation. The clear solution was filtered through a 0.2 μm PTFE syringe filter to remove any extraneous impurities such as dust particles. The solution was spin-coated onto a bare silicon wafer (4" diameter) and dried for 120 seconds at 100° C. in an oven to a thickness of 4.2 μm. This dried film was cured by a Blak-ray UV lamp Model 100 AP and then tested to determine its chemical resistance (see Table 1). The refractive index is reported in Table 2.

In this example, formulation containing 10 weight percent of titanium methacrylate triisopropoxide formed a homogeneous solution, which was stable for at least 2 months upon storage at RT (23° C.).

Example 7

An ethyl acetate solution of urethane acrylate oligomer, U1, as prepared in Preparative Example 1 (1.21 g) was added to a 2-dram amber vial containing a 50% zirconium diacrylate dibutoxide in ethyl acetate solution from Gelest, Inc. (0.97 g) and 1-hydroxy-cyclohexyl-phenyl-ketone, Irgacure 184 from Ciba Specialty Chemicals (0.06 g). Additional ethyl acetate (1.22 g) was added to adjust concentration to 35% solids. The resulting mixture was homogeneous but slightly hazy after 2 hours of agitation. The homogeneous solution was filtered through a 0.2 μm PTFE syringe filter to remove any extraneous impurities such as dust particles. The clear solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, 40 weight percent of zirconium diacrylate dibutoxide formed a homogeneous solution with urethane acrylate oligomer. The solution was stable for at least 3 months upon storage at RT (23° C.). Addition of zirconium diacrylate dibutoxide did not result in any loss of transparency compared to cured film of urethane acrylate oligomer, U1, of Comparative Example 1.

Preparative Example 5

In a 60-mL amber bottle, urethane acrylate oligomer, U1, (6.9 g), was dissolved in 2-butanone (4.6 g). The resulting mixture was homogeneous 1.0 and clear after 20 minutes of rolling on a two mill roller at maximum speed.

Preparative Example 6

In a 100-mL one-neck round bottom flask equipped with a stir bar and a rubber septum, hafnium n-butoxide, Catalog No. AKH325 from Gelest, Inc. (15.42 g) was cooled in an ice bath to 5° C. Acrylic acid, Catalog No. 147230 from Aldrich Co. (9.92 g) was added dropwise to the flask by syringe over a period of 45 minutes. The solution was stirred at room temperature for 12 hours then rotovapped at 40° C. for 1 hour. The residue was dried under vacuum at 50° C. for 2 hours in a vacuum oven.

Example 8

A 2-butanone solution of urethane acrylate oligomer, U1, as prepared in Preparative Example 5 (1.08 g) was added to a 2-dram amber vial containing hafnium acrylate synthesized in Preparative Example 6 (0.35 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g). Additional 2-butanone (1.01 g) was added to adjust the concentration to 40% solids. The resulting mixture was homogeneous and clear after 24 hours of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero are reported in Table 2.

In this example, 35 weight percent of hafnium acrylate formed a homogeneous solution with urethane acrylate oligomer, U1. Addition of hafnium acrylate did not result in any loss of transparency compared to cured film of urethane acrylate oligomer, U1, of Comparative Example 1.

Example 9

An ethyl acetate solution of urethane acrylate oligomer, U1, as prepared in Preparative Example 1 (1.20 g) and an ethyl acetate solution of zirconyl dimethacrylate as prepared in Preparative Example 4 (0.48 g) was added to a 2-dram amber vial containing a 50% zirconium diacrylate dibutoxide in ethyl acetate solution from Gelest, Inc. (0.49 g) and 1-hydroxy-cyclohexyl-phenyl-ketone, Irgacure 184 from Ciba Specialty Chemicals (0.06 g). Additional ethyl acetate (1.21 g) was added to adjust concentration to 35% solids. The resulting mixture was homogeneous and clear after 5 minutes of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

This is an example where two types of metal-containing precursor units were used in combination. The formulation containing 20 weight percent each of zirconyl dimethacrylate and zirconium diacrylate dibutoxide formed clear solution. The solution was stable for at least 4 months. Addition of zirconyl dimethacrylate and zirconium diacrylate dibutoxide did not result in any loss of transparency compared to cured film of urethane acrylate oligomer, U1, of Comparative Example 1.

Preparative Example 7

In a 120-mL amber bottle, zirconyl dimethacrylate, Catalog No. CXZR051 from Gelest, Inc. (21 g), was dissolved in 2-butanone (31 g). The resulting mixture was homogeneous and clear after 5 hours of rolling on a two mill roller at maximum speed.

Example 10

A 2-butanone solution of urethane acrylate oligomer, U1 as prepared in Preparative Example 5 (0.99 g) and a solution of zirconyl dimethacrylate as prepared in Preparative Example 7 (0.34 g) were added to a 2-dram amber vial containing hafnium acrylate synthesized in Preparative Example 6 (0.20 g), 1-hydroxy-cyclohexyl-phenyl-ketone, Irgacure 184 from Ciba Specialty Chemicals (0.05 g), and bis(2,4,6-trimethyl-benzoyl)-phenylphosphineoxide, Irgacure 819 from Ciba Specialty Chemicals (0.01 g). Additional 2-butanone (0.91 g) was added to adjust the concentration to 40% solids. The resulting mixture was homogeneous and clear after 24 hours of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero as well as refractive index are reported in Table 2.

This is an example where two types of metal-containing precursor units were used in combination. The formulation containing 20 weight percent each of zirconyl dimethacrylate and hafnium acrylate formed clear solution. The solution was stable for at least 1 month. Addition of zirconyl dimethacrylate and hafnium acrylate did not result in any loss of transparency compared to cured film of urethane acrylate oligomer, U1, of Comparative Example 1.

Preparative Example 8

In a 60-mL amber bottle, another variety of urethane acrylate oligomer, U2, Catalog No. NTX7295 from Sartomer Company (30 g) was dissolved in 2-butanone (20 g). The resulting mixture was homogeneous and clear after 45 minutes of rolling on a two mill roller at maximum speed.

Example 11

A 2-butanone solution of urethane acrylate oligomer, U2, as prepared in Preparative Example 8 (1.03 g) and a solution of zirconyl dimethacrylate as prepared in Preparative Example 7 (0.33 g) were added to a 2-dram amber vial containing hafnium acrylate as synthesized in Preparative Example 6 (0.21 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g). Additional 2-butanone (0.89 g) was added to adjust the concentration to 40% solids. The resulting mixture was homogeneous and clear after 24 hours of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. The dried, uncured film was hazy. The percent transmittance values of the cured film measured at 420, 530, and 650 nm at time zero are reported in Table 2.

The results of Example 11 show that a formulation with a different variety of urethane acrylate oligomer, U2, was not found to be compatible with the metal precursor units, zirconyl dimethacrylate and hafnium acrylate as determined by less than 80% transmittance of the film formed from this composition. In comparison, U1 shows excellent compatibility in a similar composition as shown in Example 10.

Example 12

A 2-butanone solution of urethane acrylate oligomer, U1, as prepared in Preparative Example 5 (0.66 g), a solution of urethane acrylate oligomer, U2, as prepared in Preparative Example 8 (0.34 g), and a solution of zirconyl dimethacrylate as prepared in Preparative Example 7 (0.33 g) were added to a 2-dram amber vial containing hafnium acrylate as synthesized in Preparative Example 6 (0.20 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g). Additional 2-butanone (0.90 g) was added to adjust the concentration to 40% solids. The resulting mixture was homogeneous and clear after 24 hours of agitation. The clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero as well as refractive index are reported in Table 2.

The film formed by the composition of Example 12 shows % transmittance of >90 (Table 2) suggesting that a blend of two types of urethane acrylate oligomers, U2 and U1 shows better compatibility with zirconyl methacrylate and hafnium acrylate than the composition of Example 11 where only U2 was used and % transmittance of the film was <80.

Preparative Example 9

In a 100-mL one-neck round bottom flask equipped with a stir bar and a rubber septum, zirconium n-butoxide (80% in n-butanol), Catalog No. AKZ945 from Gelest, Inc. (12.78 g) was cooled in an ice bath to 5° C. Acrylic acid, Catalog No. 147230 from Aldrich Co. (8.06 g) was added dropwise to the flask by syringe over a period of 45 minutes. The solution was stirred at room temperature for 12 hours then rotovapped at 40° C. for 1 hour. The residue was dried under vacuum at 50° C. for 2 hours in a vacuum oven.

Example 13

A 2-butanone solution of urethane acrylate oligomer, U1, as prepared in Preparative Example 5 (1.03 g) and a solution of zirconyl dimethacrylate as prepared in Preparative Example 7 (0.33 g) were added to a 2-dram amber vial containing zirconium acrylate synthesized in Preparative Example 9 (0.20 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g). Additional 2-butanone (0.91 g) was added to adjust the concentration to 40% solids. The resulting mixture was homogeneous and clear after 24 hours of agitation. The clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero as well as refractive index are reported in Table 2.

This is an example where two metal-containing precursor units were used in combination. The formulation containing 20 weight percent each of zirconyl dimethacrylate and zirconium acrylate formed clear solution. The solution was stable for at least 1 month. Addition of zirconyl dimethacrylate and zirconium acrylate did not result in any loss of transparency compared to cured film of urethane acrylate oligomer of Comparative Example 1.

Example 14

An ethyl acetate solution of zirconyl dimethacrylate as prepared in Preparative Example 4 (1.60 g) was added to a 2-dram amber vial containing 1-hydroxy-cyclohexyl-phenyl-ketone, Irgacure 184 from Ciba Specialty Chemicals (0.04 g). Additional ethyl acetate (0.66 g) was added to adjust the concentration to 35% solids. The resulting mixture was homogeneous and clear after 5 minutes of agitation. The clear solution was filtered through a 0.2 µm PTFE syringe filter to remove any extraneous impurities such as dust particles. The filtered solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero and after storage for 120 days at 23° C., as well as refractive index are reported in Table 2.

In this example, a transparent cured film was formed by zirconyl dimethacrylate without a prepolymer unit such as urethane acrylate oligomer and the film showed no loss of transparency after 3 months of storage.

Example 15

In a 2-dram amber vial, a mixture of a 50% zirconium diacrylate dibutoxide in ethyl acetate solution from Gelest, Inc. (1.61 g) and 1-hydroxy-cyclohexyl-phenyl-ketone, Irgacure 184 from Ciba Specialty Chemicals (0.04 g), was diluted in ethyl acetate (0.66 g). The resulting mixture was homogeneous and clear after 5 minutes of agitation. The clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its transparency, hardness, refractive index, and scratch resistance (see Table 1). The percent transmittance values of the cured film measured at 420, 530, and 650 nm at time zero and after storage for 120 days at 23° C., as well as refractive index are reported in Table 2.

In this example, zirconium diacrylate dibutoxide formed a transparent cured film without a prepolymer unit such as urethane acrylate oligomer and the film showed no loss of transparency after 3 months of storage.

Example 16

In a 2-dram amber vial, a mixture of hafnium acrylate as synthesized in Preparative Example 6 (1.00 g), 1-hydroxy-cyclohexyl-phenyl-ketone, Irgacure 184 from Ciba Specialty Chemicals (0.05 g), and bis(2,4,6-trimethylbenzoyl)-phenylphosphineoxide, Irgacure 819 from Ciba Specialty Chemicals (0.01 g), was dissolved in 2-butanone (1.52 g) to the concentration to 40% solids. The resulting mixture was homogeneous and clear after 24 hours of agitation. The clear solution was filtered through a 0.2 µm PTFE syringe filter to remove any extraneous impurities such as dust particles. The solution was coated onto a Luminor T PET film from Toray (75 µm thick) with a wire-wound coater (3 mil diameter), Catalog No. AR-4103 from BYK Gardner to a wet film thickness of about 5 µm and dried for 120 seconds at 80° C. in an oven. This dried film was cured by a Blak-ray UV lamp Model 100 AP and then tested to determine its scratch resistance, hardness, and chemical resistance (see Table 1). The percent transmittance values of the cured film measured at 420, 530, and 650 nm at time zero are reported in Table 2.

In this example, a transparent cured film was formed by hafnium acrylate without a prepolymer unit such as urethane acrylate oligomer and the film did not show any loss of transparency for at least one month of storage.

Example 17

Prophetic

A homogeneous solution of titanasilasesquioxane of the type shown in Structure XIV is prepared by dissolving a portion of the compound (0.30 g) in ethyl acetate (0.30 g). This solution is added to a homogeneous solution of diurethane dimethacrylate (0.70 g) in ethyl acetate (0.47 g) in proportion so that the final mixture contains titanasilasesquioxane (30% by weight). Irgacure 184, 1-hydroxy-cyclohexyl-phenyl-ketone (0.05 g), is added. Solution is adjusted to a concentration to 35% solids with ethyl acetate (0.68 g). The resulting mixture is homogeneous after 48 hours of agitation. The homogeneous solution is filtered through a 0.2 μm PTFE syringe filter to remove any extraneous impurities such as dust particles. The filtered solution is coated onto a Luminor T PET film from Toray (75 μm thick) with a wire-wound coater (3 mil diameter), Catalog No. AR-4103 from BYK Gardner to a wet film thickness of about 5 μm and dried for 120 seconds at 80° C. in an oven. This dried film is cured by a Blak-ray UV lamp Model 100 AP.

Completion of the curing reaction for all the films in the above examples up through and including Example 16 was determined by mechanically rubbing a cotton swab soaked in acetone. Fully cured films did not show any solubility in acetone. This test was also performed to test the chemical resistance of a given formulation. If no damage was observed by the naked eye, the coating is evaluated as "pass", otherwise the coating is evaluated as "fail".

Relative scratch resistance of a film was measured by scratching the coated PET film with fine steel wool (Grade #0000) four times with a load of 400 g. The naked eye observed range of scratch resistance is from 1 to 3 where 1 is excellent (no scratches), 2 is fair (some scratching), and 3 is poor (severe scratching). Pencil hardness of a film was measured by pencils of different hardness starting with 4H and decreasing in hardness to 6B until pencil did not mark film as determined with the naked eye. Transparency of a film was measured using a UV/Vis Spectrophotometer at wavelengths of 420 nm, 530 nm and 650 nm. Refractive index measurements were performed using a Metricon Gadolinium Garnet Prism Model 2010 or an Atago Abbe Refractometer model NAR-1T.

TABLE 1

| Example No. | Relative Scratch Resistance (Rating 0-3) | Pencil Hardness (Rating 4H-6B) | Chemical Resistance (pass or fail) |
|---|---|---|---|
| PET | 3 | 2B | pass |
| Comparative 1 | 1 | 4H | pass |
| Comparative 2 | 1 | 3H | pass |
| 1 | 1 | 4H | pass |
| 2 | 2 | 4H | pass |
| 3 | 3 | 3B | pass |
| 4 | 1 | 2H | pass |
| 5 | Not measured | Not measured | pass |
| 6 | Not measured | Not measured | pass |
| 7 | 2 | HB | pass |
| 8 | 0 | 4H | pass |
| 9 | 2 | 2H | pass |
| 10 | 1 | 3H | pass |
| 12 | 1 | 4H | pass |
| 13 | 1 | 2H | pass |
| 14 | 3 | 3B | pass |
| 15 | 2 | 2B | pass |
| 16 | 3 | 4B | pass |

TABLE 2

| Example No. | Time zero | | | Time 120 days | | | Refractive Index of Film at 532 nm [a] |
|---|---|---|---|---|---|---|---|
| | % T at 420 nm | % T at 530 nm | % T at 650 nm | % T at 420 nm | % T at 530 nm | % T at 650 nm | |
| PET | 100.0 | 99.6 | 99.5 | 100.0 | 99.6 | 99.4 | 1.70 |
| Comparative 1 | 100.0 | 99.4 | 99.5 | 100.0 | 99.4 | 99.4 | 1.49 |
| Comparative 2 | 100.0 | 99.4 | 99.3 | 100.0 | 99.4 | 99.5 | 1.49 |
| 1 | 99.7 | 99.4 | 99.3 | 99.6 | 99.4 | 99.4 | 1.53 |
| 2 | 99.5 | 99.2 | 99.1 | 99.6 | 99.1 | 99.0 | 1.55 |
| 3 | 99.3 | 99.1 | 99.0 | 99.4 | 99.2 | 99.1 | 1.57 |
| 4 | 99.6 | 99.3 | 99.2 | 99.7 | 99.4 | 99.2 | 1.55 |
| 5 | | | | Not measured | | | 1.46 [b] |
| 6 | | | | Not measured | | | 1.49 [b] |
| 7 | 99.4 | 99.2 | 99.1 | 99.5 | 99.3 | 99.2 | 1.56 |
| 8 | 99.7 | 99.4 | 99.3 | Not measured | | | |
| 9 | 99.6 | 99.3 | 99.2 | 99.7 | 99.4 | 99.2 | 1.56 |
| 10 | 99.7 | 99.4 | 99.3 | Not measured | | | 1.63 |
| 11 | 66.4 | 75.1 | 79.2 | Not measured | | | |
| 12 | 99.8 | 99.6 | 99.5 | Not measured | | | 1.62 |
| 13 | 99.5 | 99.2 | 99.1 | Not measured | | | 1.58 |
| 14 | 99.2 | 99.0 | 98.9 | 99.3 | 99.0 | 98.8 | 1.58 |
| 15 | 98.3 | 97.0 | 96.3 | 98.5 | 96.9 | 96.2 | 1.57 |
| 16 | 99.8 | 99.5 | 99.3 | Not measured | | | |

[a] Film applied 5 μm thick Measured by Atago Abbe Refractometer at 532 nm
[b] Refractive index measured by Metricon Gadolinium Garnet Prism on Silicon at 414 nm

What is claimed is:

1. A composition formed by reacting compounds comprising:
   a. a metal-containing precursor unit MU comprising at least one member selected from the group consisting of 1) a unit represented by Structure 1

   Structure I where M comprises at least one metal selected from the group consisting of Zr, Hf, Ge, and Ti; A comprises at least one member selected from the group consisting of:

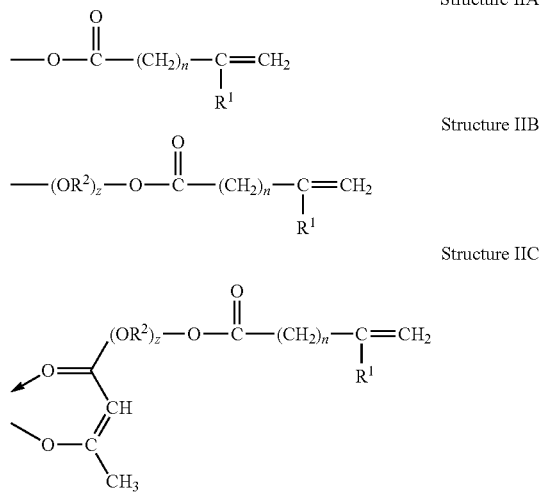

where $R^1$ is a H atom, an alkyl group containing 1-8 carbon atoms, a group containing a halogen atom, or a hydroxyalkyl group, and n is 0-6; $R^2$ represents an alkyl group or a substituted or unsubstituted aryl group, and z is 1-3; B and C each comprise a member selected from the group consisting of oxygen, sulfur, a halogen atom and —$OR^3$ where $R^3$ represents an alkyl group, a halo-alkyl group, or a substituted or unsubstituted aryl group; w is 1-5, x is 0-4, y is 0-4, and w+x+y is 1-5;
   wherein at least a portion of the metal-containing precursor unit contains at least two ethylenically unsaturated functional groups, and
   b. a catalyst or an initiator capable of inducing a reaction of ethylenically unsaturated functional groups of the metal-containing precursor units,
   wherein at least 90 weight % of compounds containing ethylenically unsaturated functional groups are represented by Structure I, and the composition is optically clear as measured by the Transmittance Test.

2. The composition of claim 1, having an index of refraction in the range of 1.4 to 1.8 in the 400-700 nm range of light and 1.4 to 2.4 in the 150-400 nm range of light.

3. The composition of claim 1, having a transmittance of at least 95% as measured by the Transmittance Test.

4. The composition of claim 1, wherein the composition is cured to form a film or article having at least 90% retention of optical clarity.

5. The composition of claim 1, wherein the metal-containing precursor unit comprises at least one member selected from the group consisting of zirconium, hafnium, titanium, and germanium compounds of (meth)acrylate, vinylacetate, (meth)acryloxyethylacetoacetate, and vinylacetoxyethyl-acetoacetate; zirconium, hafnium, titanium, and germanium alkoxide compounds of mono-, di-, or tri-(meth)acrylate, vinylacetate, (meth)acryloxyacetoacetate, and vinylacetoxyaceto-acetate; zirconyl, titanium oxide, and hafnium oxide compounds of di(meth)acrylate, di(vinylacetate), di(2-ethoxy(meth)acrylate), di(2-ethoxyvinylacetate), bis(3-(2,2-dimethoxypropoxy)(meth)acrylate), and bis(3-(2,2-dimethoxypropoxy)vinylacetate).

6. The composition of claim 1, wherein the metal-containing precursor unit comprises at least one member selected from the group consisting of zirconyl di(meth)acrylate, zirconium (meth)acrylate, hafnium (meth)acrylate and zirconium di(meth)acrylate dibutoxide.

7. The composition of claim 1, further comprising a co-monomer with only one ethylenically unsaturated functional group.

8. The composition of claim 1, wherein the compounds undergo the reaction in the presence of at least one of UV light and heat.

9. A film or article formed from the composition of claim 1.

10. The film or article of claim 9, having at least 90% retention of optical clarity.

11. The composition of claim 1 where about 100 weight % of ethylenically unsaturated functional groups are represented by Structure I.

12. The composition of claim 1, further comprising an adhesion promoter.

13. The composition of claim 1, further comprising at least one of a colorant and a dye.

14. A composition comprising:
   a. a metal-containing precursor unit, MU, represented by Structure I

   Structure I where M comprises at least one metal selected from the group consisting of Zr, Hf, Ge, and Ti; A comprises at least one member selected from the group consisting of:

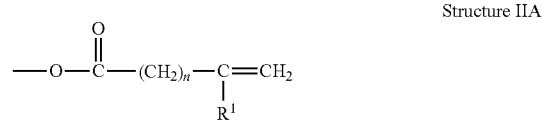

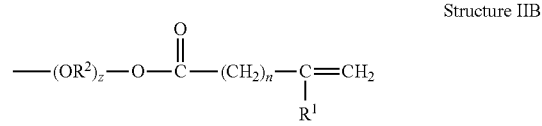

where $R^1$ is a H atom, an alkyl group containing 1-8 carbon atoms, a group containing a halogen atom, or a hydroxyalkyl group, and n is 0-6; $R^2$ represents an alkyl group or a substituted or unsubstituted aryl group, and z is 1-3; B and C each comprise a member selected from the group consisting of oxygen, sulfur, a halogen atom and —$OR^3$ where $R^3$ represents an alkyl group, a halo-alkyl group, or a substituted or unsubstituted aryl group; w is 1-5, x is 0-4, y is 0-4, and w+x+y is 1-5;

wherein at least a portion of the metal-containing precursor unit contains at least two ethylenically unsaturated functional groups, and b. a catalyst or an initiator capable of inducing a reaction of ethylenically unsaturated functional groups of the metal-containing precursor units;

wherein at least 90 weight % of compounds containing ethylenically unsaturated functional groups are represented by Structure I, and the composition, after reaction, is optically clear as measured by the Transmittance Test.

15. The composition of claim 14, further comprising an adhesion promoter.

16. The composition of claim 14, further comprising at least one of a colorant and a dye.

17. A method of forming an article comprising:
a. preparing a mixture comprising a metal-containing precursor unit, MU, and a catalyst or initiator under conditions sufficient to induce a reaction of ethylenically unsaturated functional groups of the metal-containing precursor units; the metal-containing precursor unit is represented by Structure 1

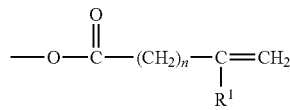
Structure I where M comprises at least one metal selected from the group consisting of Zr, Hf, Ge, and Ti; A comprises at least one member selected from the group consisting of:

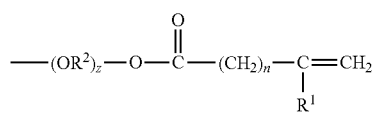
Structure IIA

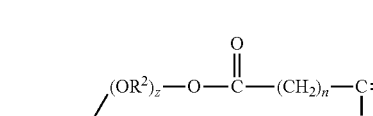
Structure IIB

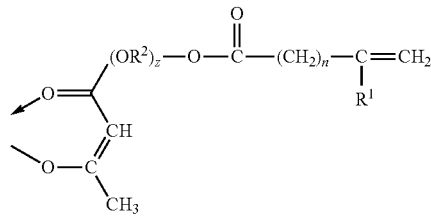
Structure IIC where $R^1$ is a H atom, an alkyl group containing 1-8 carbon atoms, a group containing a halogen atom, or a hydroxyalkyl group, and n is 0-6; $R^2$ represents an alkyl group or a substituted or unsubstituted aryl group, and z is 1-3; B and C each comprise a member selected from the group consisting of oxygen, sulfur, a halogen atom and $—OR^3$ where $R^3$ represents an alkyl group, a halo-alkyl group, or a substituted or unsubstituted aryl group; w is 1-5, x is 0-4, y is 0-4, and w+x+y is 1-5; wherein at least a portion of the metal-containing precursor unit contains at least two ethylenically unsaturated functional groups, and at least 90 weight % of compounds containing ethylenically unsaturated functional groups are represented by Structure I, b. forming the mixture into an article, and c. curing the article, the cured article being optically clear as measured by the Transmittance Test.

18. The method of claim 17, wherein the mixture is at least partially cured prior to forming the article.

19. The method of claim 17, wherein the article is a film.

20. A composition comprising:
a. a metal-containing precursor unit MU comprising at least one member selected from the group consisting of 1) a unit represented by Structure 1

$MA_wB_xC_y$  Structure I where M comprises a metal with formal valency of 0-5 selected from the group consisting of Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y; A comprises at least one member selected from the group consisting of:

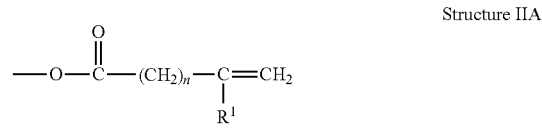
Structure IIA

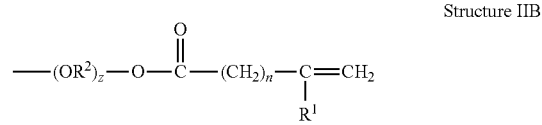
Structure IIB

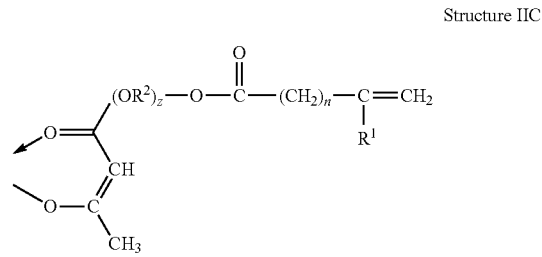
Structure IIC where $R^1$ is a H atom, an alkyl group containing 1-8 carbon atoms, a group containing a halogen atom, or a hydroxyalkyl group, and n is 0-6; $R^2$ represents an alkyl group or a substituted or unsubstituted aryl group, and z is 1-3; B and C each comprise a member selected from the group consisting of oxygen, sulfur, a halogen atom and $—OR^3$ where $R^3$ represents an alkyl group, a halo-alkyl group, or a substituted or unsubstituted aryl group; w is 1-5, x is 0-4, y is 0-4, and w+x+y is 1-5;

wherein at least a portion of the metal-containing precursor unit contains at least two ethylenically unsaturated functional groups, b. a prepolymer unit comprising at least one member selected from the group consisting of urethane (meth)acrylate, urethane multi(meth)acrylate, multiurethane (meth)acrylate, multiurethane multi(meth)acrylate, 1,6-hexanediol di(meth)acrylate, tetraethyleneglycol di(meth)acrylate, divinylbenzene ethoxylated bisphenol-A-di(meth)acrylate, diethylene glycol bis(allyl carbonate), trimethylolpropane tri(meth)acrylate, ditrimethylolpropane tetra(meth)acrylate, pentaerythritol tri(meth)acrylate, pentaerythritol tetra(meth)acrylate, dipentaerythritol penta-/hexa-(meth)acrylate, isocyanurate tri(meth)acrylate, bis(2-hydroxyethyl)isocyanurate di(meth)acrylate 1,3-butanediol di(meth)acrylate, 1,4-butanediol di(meth)acrylate, neopentyl glycol di(meth) acrylate, and (meth)acrylate modified-urea-formaldehyde, melamine-formaldehyde and cellulose, c. a catalyst or an initiator capable of inducing a reaction of ethylenically unsaturated functional groups of the metal-containing precursor units, and d. a solvent in an amount of at least 20 weight % based on the total weight of metal-containing precursor unit MU, catalyst and solvent, wherein the composition, after reaction, is optically clear as measured by the Transmittance Test.

21. The composition of claim 20 wherein the solvent comprises at least one member selected form the group consisting of ketones, ethers, esters and alcohols.

22. The composition of claim 20, further comprising a co-monomer with only one ethylenically unsaturated functional group.

23. The composition of claim 20, wherein the compounds undergo the reaction in the presence of at least one of UV light and heat.

24. A film or article formed from the composition of claim 20 having at least 90% retention of optical clarity.

25. A method of forming an article comprising:

a. preparing a mixture comprising a metal-containing precursor unit, MU, a prepolymer unit comprising at least one member selected from the group consisting of urethane (meth)acrylate, urethane multi(meth)acrylate, multiurethane (meth)acrylate, multiurethane multi(meth)acrylate, 1,6-hexanediol di(meth)acrylate, tetraethyleneglycol di(meth)acrylate, divinylbenzene, ethoxylated bisphenol-A-di(meth)acrylate, diethylene glycol bis(allyl carbonate), trimethylolpropane tri(meth)acrylate, ditrimethylolpropane tetra(meth)acrylate, pentaerythritol tri(meth)acrylate, pentaerythritol tetra(meth)acrylate, dipentaerythritol penta-/hexa-(meth)acrylate, isocyanurate tri(meth)acrylate, bis(2-hydroxyethyl)isocyanurate di(meth)acrylate, 1,3-butanediol di(meth)acrylate, 1,4-butanediol di(meth)acrylate, neopentyl glycol di(meth)acrylate, and (meth)acrylate modified-urea-formaldehyde, melamine-formaldehyde and cellulose, and a catalyst or initiator under conditions sufficient to induce a reaction of ethylenically unsaturated functional groups of the metal-containing precursor units, and a solvent in an amount of at least 20 based on the total weight of metal-containing precursor unit MU, catalyst and solvent; the metal-containing precursor unit is represented by Structure I MA$_w$B$_x$C$_y$  Structure I where M comprises a metal with formal valency of 0-5 selected from Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y; A comprises at least one member selected from the group consisting of:

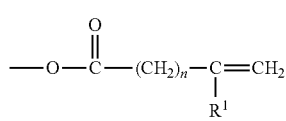

Structure IIA

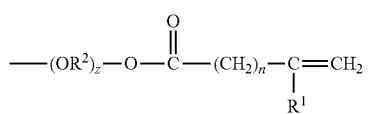

Structure IIB

-continued

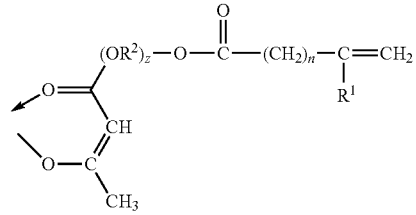

Structure IIC where R$^1$ is a H atom, an alkyl group containing 1-8 carbon atoms, a group containing a halogen atom, or a hydroxyalkyl group, and n is 0-6; R$^2$ represents an alkyl group or a substituted or unsubstituted aryl group, and z is 1-3; B and C each comprise a member selected from the group consisting of oxygen, sulfur, a halogen atom and —OR$^3$ where R$^3$ represents an alkyl group, a halo-alkyl group, or a substituted or unsubstituted aryl group; w is 1-5, x is 0-4, y is 0-4, and w+x+y is 1-5; wherein at least a portion of the metal-containing precursor unit contains at least two ethylenically unsaturated functional groups, b. forming the mixture into an article, and c. curing the article, the cured article being optically clear as measured by the Transmittance Test.

26. The method of claim 25 wherein the solvent comprises at least one member selected from the group consisting of ketones, ethers, esters and alcohols.

27. The method of claim 25, wherein the mixture is at least partially cured prior to forming the article.

28. A composition formed by reacting compounds comprising:

a. a metal-containing precursor unit MU comprising at least one member selected from the group consisting of 1) a unit represented by Structure I MA$_w$B$_x$C$_y$  Structure I where M comprises a metal with formal valency of 0-5 selected from Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y; A comprises at least one member selected from the group consisting of:

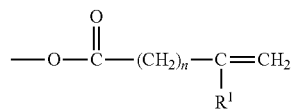

Structure IIA

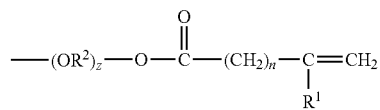

Structure IIB

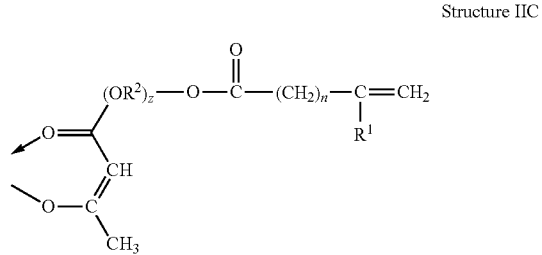

Structure IIC where $R^1$ is a H atom, an alkyl group containing 1-8 carbon atoms, a group containing a halogen atom, or a hydroxyalkyl group, and n is 0-6; $R^2$ represents an alkyl group or a substituted or unsubstituted aryl group, and z is 1-3; B and C each comprise a member selected from the group consisting of oxygen, sulfur, a halogen atom and —$OR^3$ where $R^3$ represents an alkyl group, a halo-alkyl group, or a substituted or unsubstituted aryl group; w is 1-5, x is 0-4, y is 0-4, and w+x+y is 1-5;

wherein at least a portion of the metal-containing precursor unit contains at least two ethylenically unsaturated functional groups, b. a prepolymer unit, PU, containing at least two ethylenically unsaturated functional groups, and c. a catalyst or an initiator capable of inducing a reaction of ethylenically unsaturated functional groups of the metal-containing precursor units, wherein at least 90 weight % of compounds containing ethylenically unsaturated functional groups are represented by Structure I, and the composition is optically clear as measured by the Transmittance Test.

29. The composition of claim 28, having an index of refraction in the range of 1.4 to 1.8 in the 400-700 nm range of light and 1.4 to 2.4 in the 150-400 nm range of light.

30. The composition of claim 28, having a transmittance of at least 95% as measured by the Transmittance Test.

31. The composition of claim 28, wherein the composition is cured to form a film or article having at least 90% retention of optical clarity.

32. The composition of claim 28, wherein the compounds undergo the reaction in the presence of at least one of UV light and heat.

33. A film or article formed from the composition of claim 28.

34. The film or article of claim 33, having at least 90% retention of optical clarity.

35. A composition comprising:

a. a metal-containing precursor unit, MU, represented by Structure I $$MA_wB_xC_y \qquad \text{Structure I}$$

where M comprises a metal with formal valency of 0-5 selected from the group consisting of Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y; A comprises at least one member selected from the group consisting of:

Structure IIA
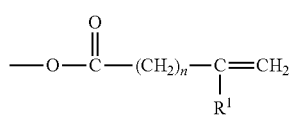

Structure IIB
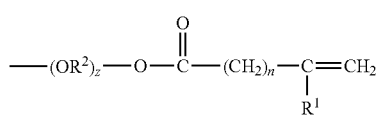

Structure IIC
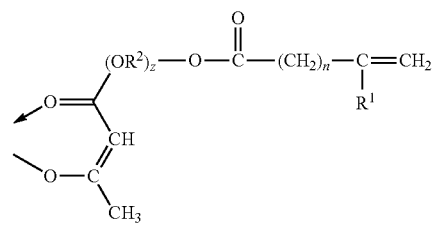

where $R^1$ is a H atom, an alkyl group containing 1-8 carbon atoms, a group containing a halogen atom, or a hydroxyalkyl group, and n is 0-6; $R^2$ represents an alkyl group or a substituted or unsubstituted aryl group, and z is 1-3; B and C each comprise a member selected from the group consisting of oxygen, sulfur, a halogen atom and —$OR^3$ where $R^3$ represents an alkyl group, a halo-alkyl group, or a substituted or unsubstituted aryl group; w is 1-5, x is 0-4, y is 0-4, and w+x+y is 1-5;

wherein at least a portion of the metal-containing precursor unit contains at least two ethylenically unsaturated functional groups, b. a prepolymer unit, PU, containing at least two ethylenically unsaturated functional groups, and c. a catalyst or an initiator capable of inducing a reaction of ethylenically unsaturated functional groups of the metal-containing precursor units, wherein at least 90 weight % of compounds containing ethylenically unsaturated functional groups are represented by Structure I, and the composition, after reaction, is optically clear as measured by the Transmittance Test.

36. The composition of claim 35, wherein the metal-containing precursor unit comprises at least one member selected from the group consisting of zirconium, hafnium, titanium, and germanium compounds of (meth)acrylate, vinylacetate, (meth)acryloxyethylacetoacetate, and vinylacetoxyethyl-acetoacetate; zirconium, hafnium, titanium, and germanium alkoxide compounds of mono-, di-, or tri-(meth)acrylate, vinylacetate, (meth)acryloxyacetoacetate, and vinylacetoxy-aceto-acetate; zirconyl, titanium oxide, and hafnium oxide compounds of di(meth)acrylate, di(vinylacetate), di(2-ethoxy(meth)acrylate), di(2-ethoxyvinylacetate), bis(3-(2,2-dimethoxypropoxy)(meth)acrylate), and bis(3-(2,2-dimethoxypropoxy)vinylacetate).

37. The composition of claim 35, wherein the metal-containing precursor unit comprises at least one member selected from the group consisting of zirconyl di(meth)acrylate, zirconium (meth)acrylate, hafnium (meth)acrylate and zirconium di(meth)acrylate dibutoxide.

38. The composition of claim 35, wherein the prepolymer unit comprises at least one member selected from the group consisting of urethane (meth)acrylate, urethane multi(meth)acrylate, multiurethane (meth)acrylate, multiurethane multi (meth)acrylate, 1,6-hexanediol di(meth)acrylate, tetraethyleneglycol di(meth)acrylate, divinylbenzene, ethoxylated bisphenol-A-di(meth)acrylate, diethylene glycol bis(allyl carbonate), trimethylolpropane tri(meth)acrylate, ditrimethylolpropane tetra(meth)acrylate, pentaerythritol tri(meth)acrylate, pentaerythritol tetra(meth)acrylate, dipentaerythritol penta-/hexa-(meth)acrylate, isocyanurate tri(meth)acrylate, bis(2-hydroxyethyl)isocyanurate di(meth)acrylate, 1,3-butanediol di(meth)acrylate, 1,4-butanediol di(meth)

acrylate, neopentyl glycol di(meth)acrylate, and (meth)acrylate modified-urea-formaldehyde, melamine-formaldehyde and cellulose.

39. The composition of claim 35, further comprising a co-monomer with only one ethylenically unsaturated functional group.

40. The composition of claim 35, further comprising an adhesion promoter.

41. The composition of claim 35, further comprising at least one of a colorant and a dye.

42. A method of forming an article comprising:
a. preparing a mixture comprising a metal-containing precursor unit, MU, a prepolymer unit, PU, and a catalyst or initiator under conditions sufficient to induce a reaction of ethylenically unsaturated functional groups of the metal-containing precursor units; the metal-containing precursor unit is represented by Structure I

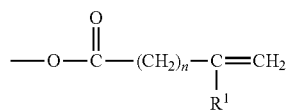   Structure I where M comprises a metal with formal valency of 0-5 selected from the group consisting of Zr, Hf, Ge, Ti, Gd, Pb, Sn, Zn, Ni, Na, Li, K, Ce, Nb, Eu, In, Al, Fe, Mn, Nd, Cu, Sb, Mg, Ag, and Y; A comprises at least one member selected from the group consisting of:

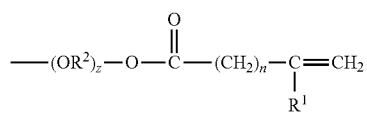   Structure IIA

Structure IIB

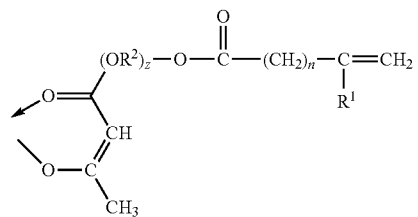   Structure IIC where $R^1$ is a H atom, an alkyl group containing 1-8 carbon atoms, a group containing a halogen atom, or a hydroxyalkyl group, and n is 0-6; $R^2$ represents an alkyl group or a substituted or unsubstituted aryl group, and z is 1-3; B and C each comprise a member selected from the group consisting of oxygen, sulfur, a halogen atom and —$OR^3$ where $R^3$ represents an alkyl group, a halo-alkyl group, or a substituted or unsubstituted aryl group; w is 1-5, x is 0-4, y is 0-4, and w+x+y is 1-5; wherein at least a portion of the metal-containing precursor unit contains at least two ethylenically unsaturated functional groups, and at least 90 weight % of compounds containing ethylenically unsaturated functional groups are represented by Structure I, b. forming the mixture into an article, and c. curing the article, the cured article being optically clear as measured by the Transmittance Test.

43. The method of claim 42, wherein the mixture is at least partially cured prior to forming the article.

44. The method of claim 42, wherein the article is a film.

* * * * *